(12) United States Patent
Apfelbeck

(10) Patent No.: US 6,695,465 B2
(45) Date of Patent: Feb. 24, 2004

(54) EXTERIOR REARVIEW MIRROR FOR VEHICLES, IN PARTICULAR, FOR MOTOR VEHICLES

(75) Inventor: Robert Apfelbeck, Plattling (DE)

(73) Assignee: Reitter & Schefenacker GmbH & Co. KG, Esslingen (DE)

( * ) Notice: Subject to any disclaimer, the term of this patent is extended or adjusted under 35 U.S.C. 154(b) by 125 days.

(21) Appl. No.: 09/771,093

(22) Filed: Jan. 26, 2001

(65) Prior Publication Data
US 2001/0010633 A1 Aug. 2, 2001

(30) Foreign Application Priority Data
Jan. 27, 2000 (DE) .......................... 200 01 407

(51) Int. Cl.⁷ ................................ B60Q 1/26
(52) U.S. Cl. .................. 362/494; 362/519; 362/545
(58) Field of Search ................. 362/444, 516, 362/519, 543, 545, 540; 340/468, 475

(56) References Cited

U.S. PATENT DOCUMENTS

| | | | |
|---|---|---|---|
| 6,005,724 A | * | 12/1999 | Todd .......................... 362/494 |
| 6,099,153 A | * | 8/2000 | Zimmermann et al. ...... 362/494 |
| 6,139,171 A | * | 10/2000 | Waldmann .................. 362/494 |
| 6,250,783 B1 | * | 6/2001 | Stidham et al. ............. 362/494 |
| 6,264,353 B1 | * | 7/2001 | Caraher et al. ............. 362/494 |
| 6,271,750 B1 | * | 8/2001 | Brautigam et al. ......... 362/494 |
| 6,347,880 B1 | * | 2/2002 | Furst et al. ................. 362/494 |
| 6,494,602 B2 | * | 12/2002 | Pastrick et al. ............. 362/494 |

* cited by examiner

Primary Examiner—Y. My Quach-Lee
Assistant Examiner—Peggy A Neils
(74) Attorney, Agent, or Firm—Gudrun E. Huckett

(57) ABSTRACT

An exterior rearview mirror for vehicles has a mirror head housing having a light-transmitting plate arranged therein. At least one lighting unit is received in the mirror head housing and has at least one light source emitting light rays so as to pass through the light-transmitting plate to the exterior of mirror head housing. At least one reflector is positioned between the at least one light source and the light-transmitting plate. The at least one reflector has at least one opening, and the at least one light source is positioned in the at least one opening. The at least one lighting unit has a lighting unit housing and the at least one light source is arranged in the lighting unit housing which is received in a receptacle of the mirror head housing.

26 Claims, 6 Drawing Sheets

EXTERIOR REARVIEW MIRROR FOR VEHICLES, IN PARTICULAR, FOR MOTOR VEHICLES

BACKGROUND OF THE INVENTION

1. Field of the Invention

The invention relates to an exterior rearview mirror for vehicles, in particular, for motor vehicles, comprising a housing receiving at least one lighting unit which is provided with at least one light source whose light rays pass through a light-transmitting plate to the exterior of the mirror.

2. Description of the Related Art

Exterior rearview mirrors are known whose mirror head comprises a lighting unit in the form of a repeat turn signal. This ensures that traffic participants located laterally adjacent to the vehicle are able to recognize easily, when the repeat turn signal is switched on, that the vehicle will be turning.

SUMMARY OF THE INVENTION

It is an object of the present invention to develop the exterior rearview mirror of the aforementioned kind such that the lighting unit fulfills reliably its lighting function while the exterior review mirror in which it is arranged has a simple constructive configuration.

In accordance with the present invention, this is achieved in that between the light source and the light-transmitting plate at least one reflector is positioned which has at least one opening in whose area the light source is located.

In the exterior rearview mirror according to the invention the light source is arranged in the area of the opening which is provided in the reflector. The light source can be arranged in the opening of the reflector such that it is not visible from the exterior through the light-transmitting plate. The reflector ensures that the light rays emitted by the light source which do not immediately reach the light-transmitting plate are reflected toward the light-transmitting plate.

DESCRIPTION OF THE PREFERRED EMBODIMENTS

The exterior rearview mirror described in the following is provided for vehicles, in particular, motor vehicles. It comprises a mirror head 1 which is connected in a way known in the art to a mirror base (not illustrated) so as to be foldable. The mirror head 1 can be folded in the travel direction to the front and to the rear. The mirror head 1 has a mirror head housing 2 that is comprised advantageously of plastic material and has an opening 3 at its backside facing to the rear relative to the travel direction. In the opening 3, a mirror glass carrier (not illustrated) for the mirror glass is positioned. This mirror glass carrier is adjustably mounted on a support 4 in a manner known in the art. The support 4 is arranged in the mirror head housing 2. Advantageously, the mirror glass carrier is adjustable by a motor. The drive motor (not illustrated) for this purpose is supported on the support 4.

Figure 1:
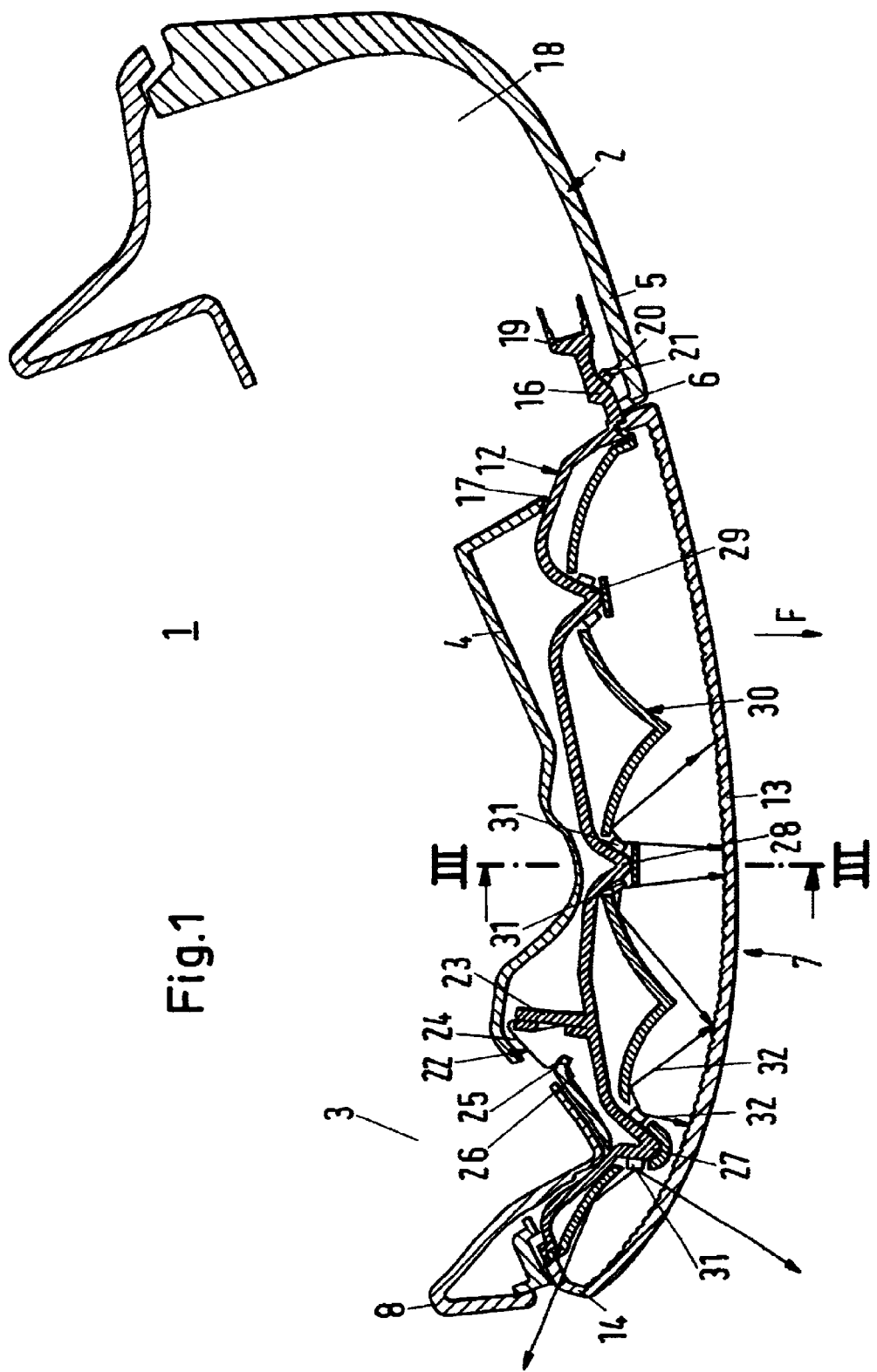
FIG. 1 is a longitudinal section of a mirror head of an exterior rearview mirror according to the invention.
Figure 3:
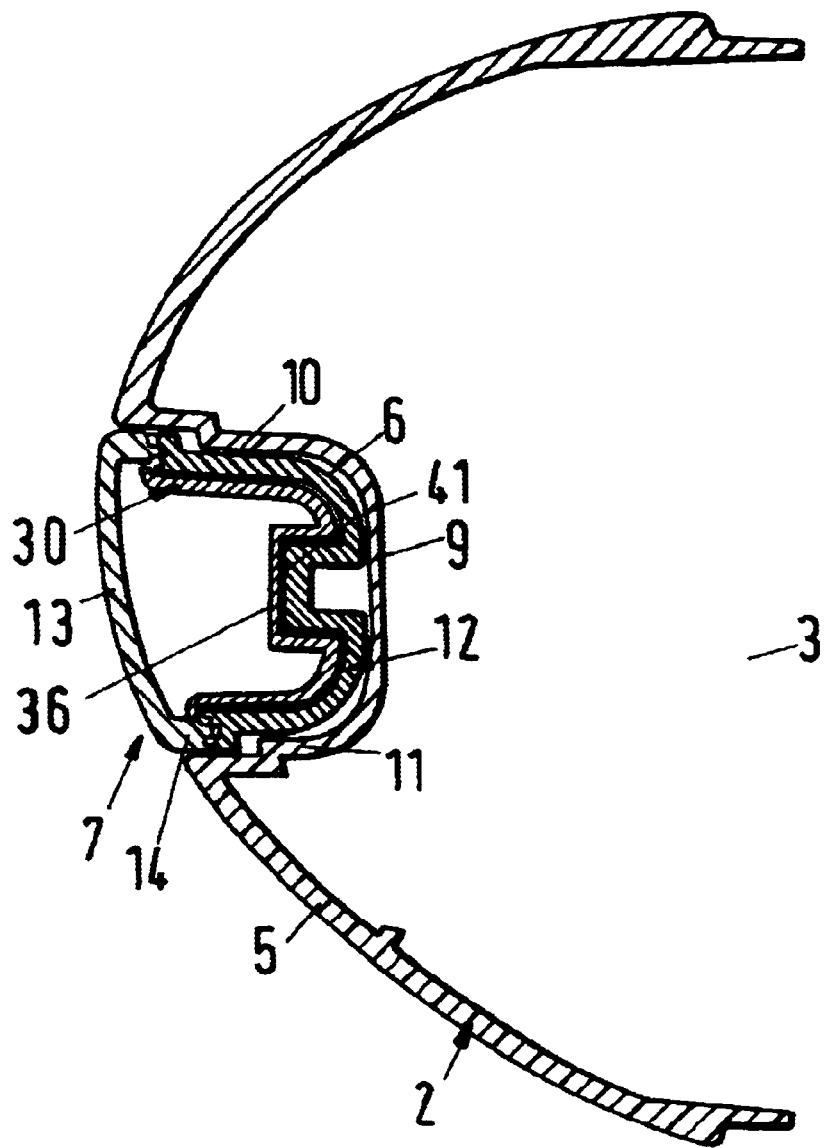
FIG. 3 shows a section along the section line III—III of FIG. 1.

The front side 5 of the mirror head housing 2 facing forward in the travel direction F is provided with a receptacle 6 (FIGS. 1 and 3) in the form of a recessed portion in which the lighting unit 7 serving as a turn signal is mounted. As is shown in FIG. 3, the receptacle 6 is positioned approximately at half the height of the front side 5 of the mirror head housing 2. FIG. 1 shows that the receptacle 6 extends across more than half the width of the mirror head 1 into the vicinity of the outer rim 8 of the mirror head housing 2 which is facing away from the vehicle. The receptacle 6 which is open toward the front side 5 of the mirror head 1 has, at least across a portion of its length, a bottom 9 (FIG. 3) which has a transition into the front wall 5 of the mirror head housing 2 via the sidewalls 10, 11. Advantageously, the bottom 9 and the sidewalls 10, 11 of the receptacle 6 are formed as monolithic parts of the mirror head housing 2.

Figure 2:
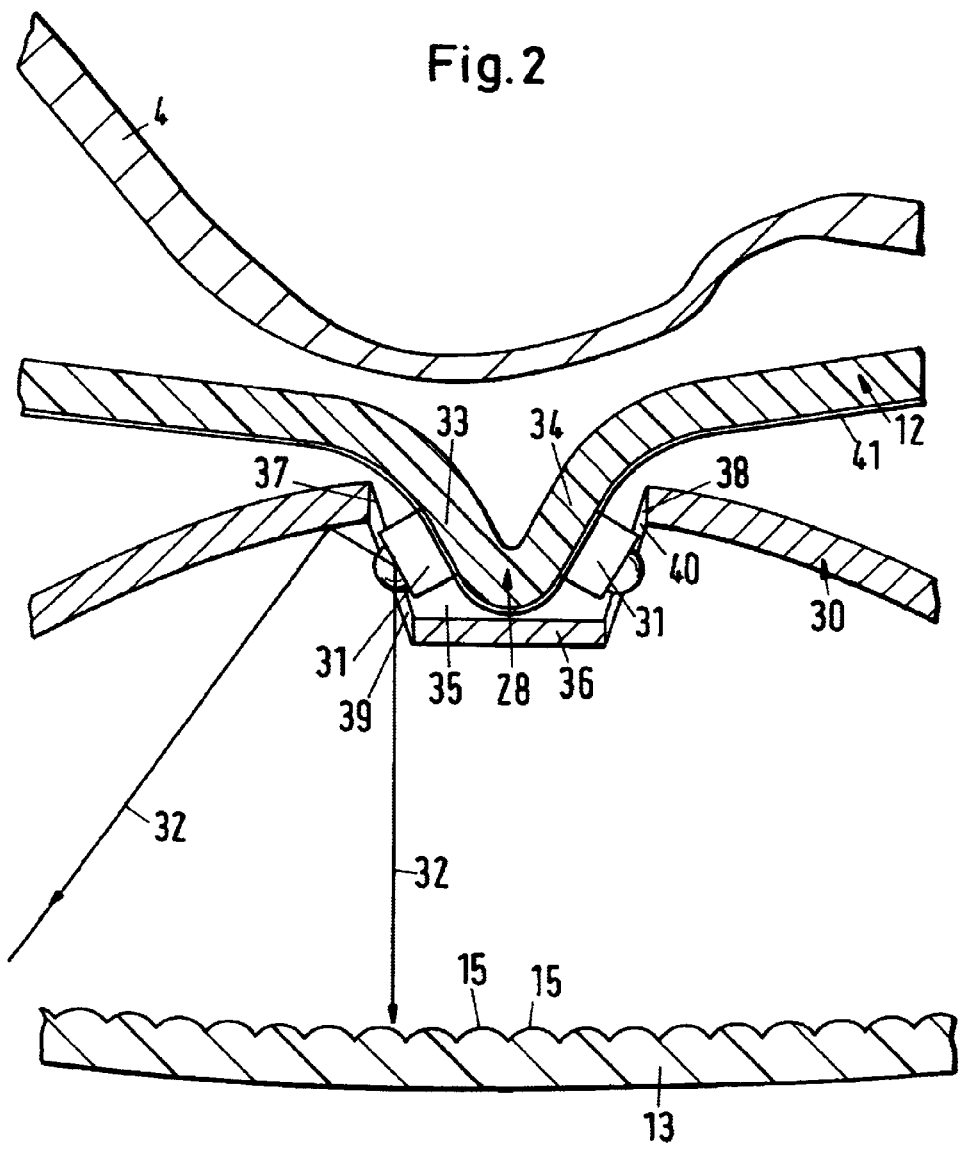
FIG. 2 shows on an enlarged scale a detail of the mirror head according to FIG. 1.

The lighting unit 7 has a lighting unit housing 12 which is matched with its contour to the cross-sectional configuration of the receptacle 6. The lighting unit housing 12 is closed by a light-transmitting plate 13 at the side facing the front wall 5 of the housing 2. Its edge 14 is angled inwardly in the direction toward the receptacle 6. The light-transmitting plate 13 is comprised of a transparent material and can be provided at its inner side with lenses 15 (FIG. 2).

The light-transmitting plate 13 is fastened by means of it is angled peripheral rim 14 on the edge of the lighting unit housing 12, for example, by being welded thereto. The light-transmitting plate 13 and the lighting unit housing 12 are advantageously made of plastic material.

The lighting unit housing 12 projects with a projection 16 (FIG. 1) through an opening 17 in the sidewall of the receptacle 6 and the support 4 into the interior 18 of the mirror head 1 enclosed by the mirror head housing 2. The projection 16 is provided at the narrow side of the elongate lighting unit housing 12 facing the mirror base and is preferably a monolithic part thereof. A plug 19 is provided on the projection 16 via which the lighting unit 7 can be supplied with the required electric current. The projection 16 rests against the seal 20 which is provided at the inner side of the mirror head housing 2 and is preferably arranged on a rib 21 which projects from the inner side of the housing 2.

In the vicinity of its end opposite the projection 16, the lighting unit housing 12 is detachably secured by a snap connection 22 in the receptacle 6. The lighting unit housing 12 has for this purpose a projection 23 at its backside facing the support 4. The projection 23 is preferably a monolithic part of the lighting unit housing 12. One end of a clip spring 24 is fastened to the projection 23. The other end 25 of the clip spring 24 is hook-shaped and engages with elastic deformation a hook-shaped projection 26 in the mounted position of the lighting unit 7. The projection 26 is provided on the bottom 9 of the receptacle 6.

According to FIG. 1, the lighting unit housing 12 is formed in longitudinal section such that several projections, in the shown embodiment three projections 27 through 29, are provided which are V-shaped in cross-section and are formed by a corresponding shaping of the lighting unit housing 12. A reflector 30 is positioned between the lighting unit housing 12 and the light-transmitting plate 13 and reflects the light emitted by the light sources 31 to the light-transmitting plate 13. In FIG. 1, the light rays 32 of the light sources 31 are illustrated in an exemplary fashion. The light sources 31 are secured on the lighting unit housing 12 and are advantageously in the form of light-emitting diodes (LEDs).

In the following, the arrangement of the light sources 31 will be explained in more detail with the aid of FIG. 2. The LEDs 31 are fastened at the sides 33, 34 of the projection 28 which sides are positioned at an acute angle to one another. In the area of the projection 28 the reflector 30 has a depression 35 which is defined by a bottom 36 and sidewalls 37, 38. In the sidewalls 37, 38, which are positioned at a spacing before the sides 33, 34 of the projection 28, openings 39, 40 are positioned through which the light sources 31 project partially. The bottom 36 of the depression 35 is positioned at a minimal spacing in front of the projection 28 and covers it relative to the light-transmitting plate 13. The bottom 36 thus forms of view protection which prevents that the projection 28 of the lighting unit housing 12 can be seen from the exterior of the mirror head through the light-transmitting plate 13.

As is illustrated in FIG. 2, a portion of the light rays 32 emitted by the LEDs 31 are sent directly to the light-transmitting plate 13. Another portion of the light rays 32 impacts first on the reflector 30 and is then reflected thereby to the light-transmitting plate 13.

In the area of the other projections 27, 29 of the lighting unit housing 12 the reflector 30 is of the same configuration as described in connection with FIG. 2.

The current supply from the plug 19 to the LEDs 31 is realized by a conductive foil 41 which is fastened on the side of the lighting unit housing 12 facing the reflector 30 and extends also across the projections 27 to 29.

Since the lighting unit housing 12 has several light sources 31 which are distributed across the length of the lighting unit 7, the light-transmitting plate 13 is uniformly illuminated. With respect to the blinker function, it is sufficient when the lighting unit housing 12 is provided with a light source 31 only in the area of the projection 27 which is near the end 8 of the mirror head 1 remote from the vehicle. As shown in FIG. 1, the light rays of the outer light source 31 are emitted relative to the travel direction F over a range beginning at a slant in the forward direction and ending at a slant to the rear. Accordingly, the blinker, when actuated by the driver of the motor vehicle, can be easily recognized by other traffic participants, in particular, such traffic participants who are in the area adjacent to the motor vehicle.

The bottom 36 of the depressions 35 of the reflector 30 also prevents that the conductive foil 41 can be seen through the light-transmitting plate 13 because it covers the conductive foil in the area of the projections 27 to 29.

Figure 4:
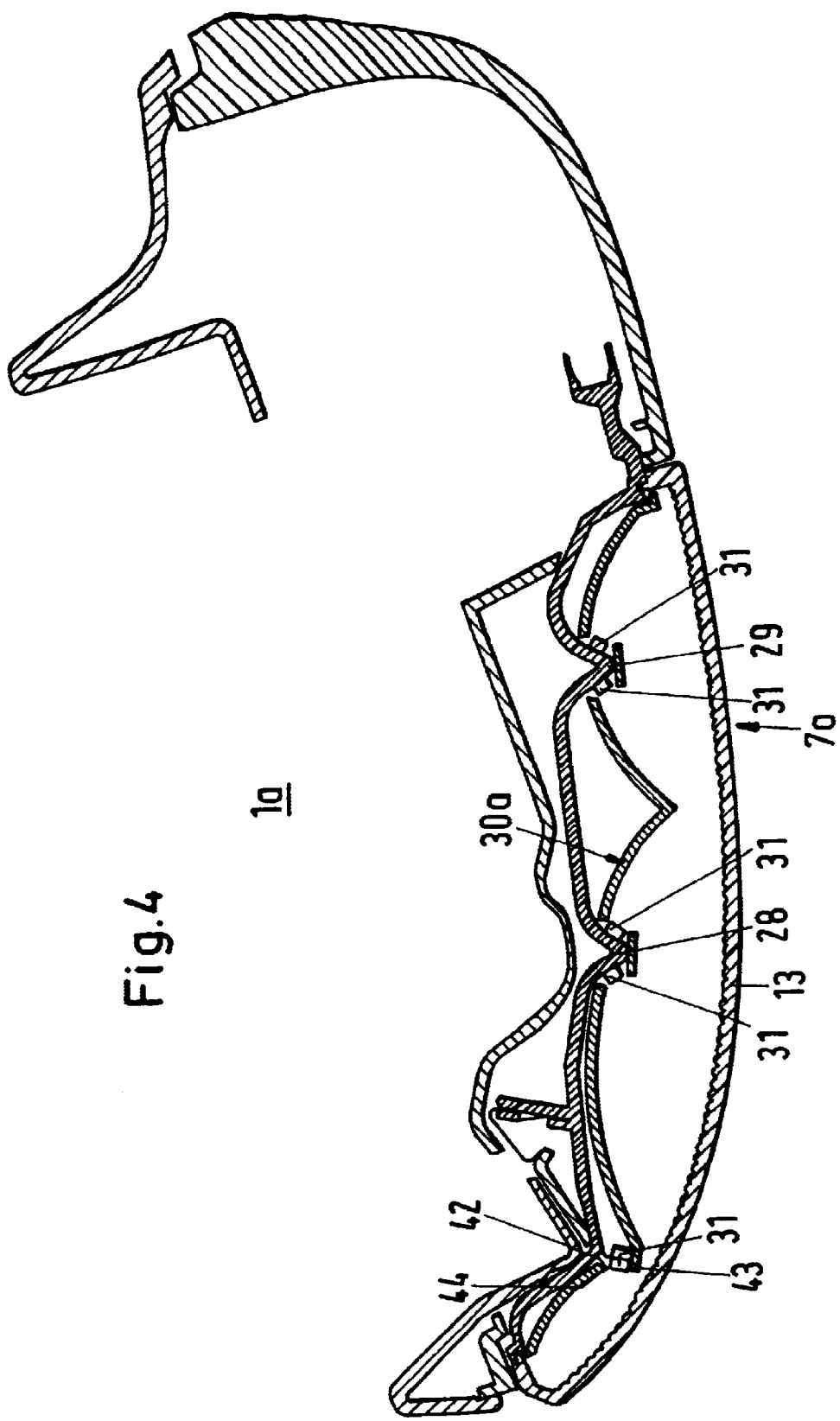
FIG. 4 is an illustration corresponding to FIG. 1 of a second embodiment of a mirror head of an exterior rearview mirror according to the invention.

FIG. 4 shows an embodiment in which the reflector 30a has an angled portion 42 instead of the projection 27 of a V-shaped cross-section, described in connection with the previous embodiment. This angled portion 42 has a wall 43 which extends transversely to the light-transmitting plate 13. An opening 44 for a light source 31 is positioned in the wall 43. Advantageously, the light source is an LED which is located in the opening 44 and whose rays are emitted through the light-transmitting plate 13 laterally to the exterior. In the direction of the light-transmitting plate 13 the light source 31 is covered by a part of the reflector 30a so that the rays emitted by the light source exit primarily laterally to the exterior. Otherwise, the mirror head 1a is of identical configuration as in the previous embodiment. The embodiment according to FIG. 4 is characterized by a constructively simple configuration. While in the embodiment according to FIGS. 1 to 3 on each projection 27 to 29 two light sources 31 are provided, on the mirror head 1a according to FIG. 4 two light sources 31 are arranged only on the projections 28, 29, respectively, while on the end portion of the lighting unit 7a remote from the motor vehicle only one light source 31 is present.

Since the conductive foil 41 is flexible, it can be applied easily onto lighting unit housings of very different configurations. Of course, the light sources 31 can also be supplied with the required electric current in other ways. For example, instead of the conductive foil 41 it is also possible to employ an MID member (molded interconnected device) onto which the LEDs 31 are soldered. A further possibility is to employ the known snap LED technology for attachment and contacting of the LEDs 31.

Figure 5:
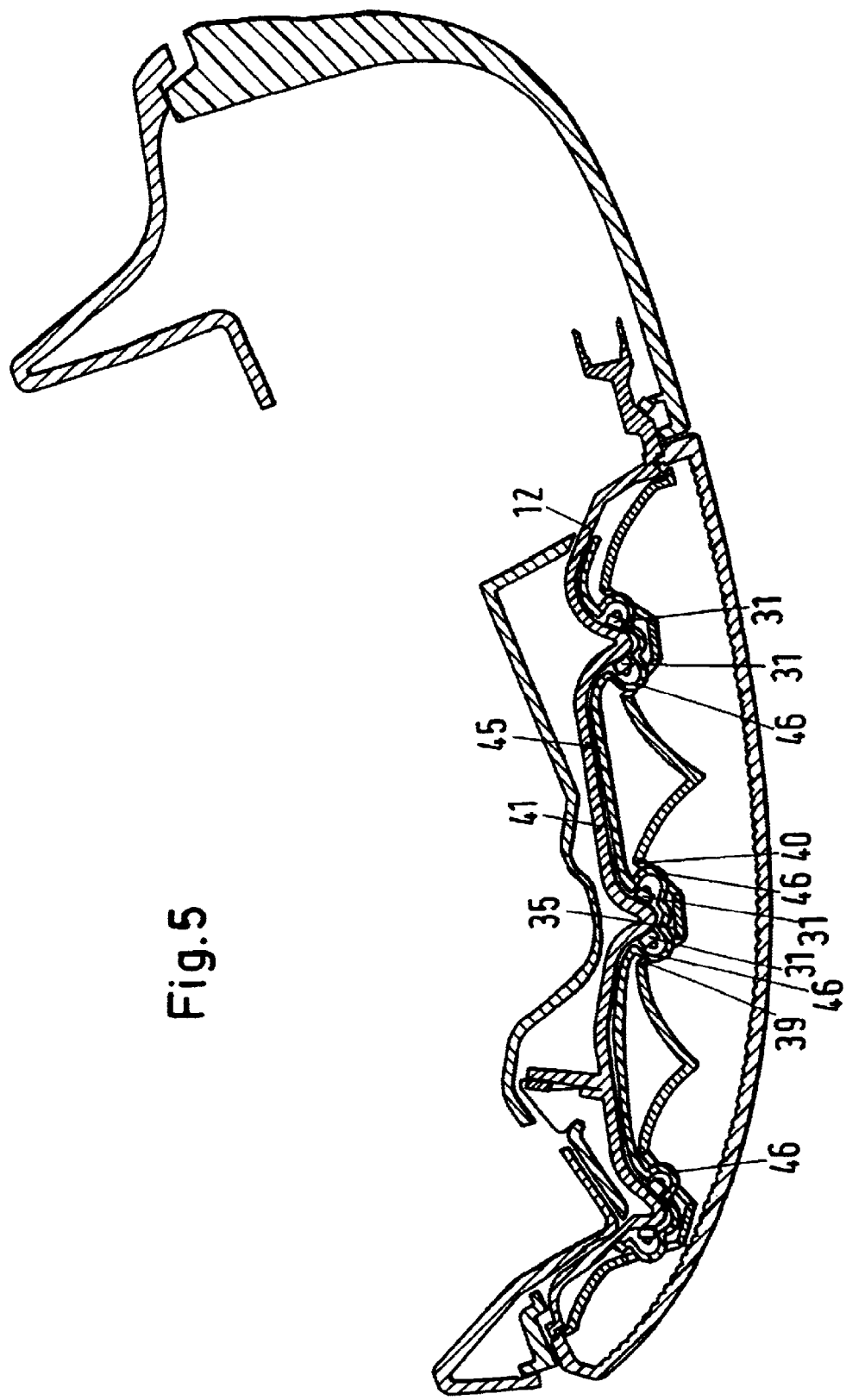
FIG. 5 shows a longitudinal section of a third embodiment of a mirror head of an exterior rearview mirror according to the invention.
Figure 6:
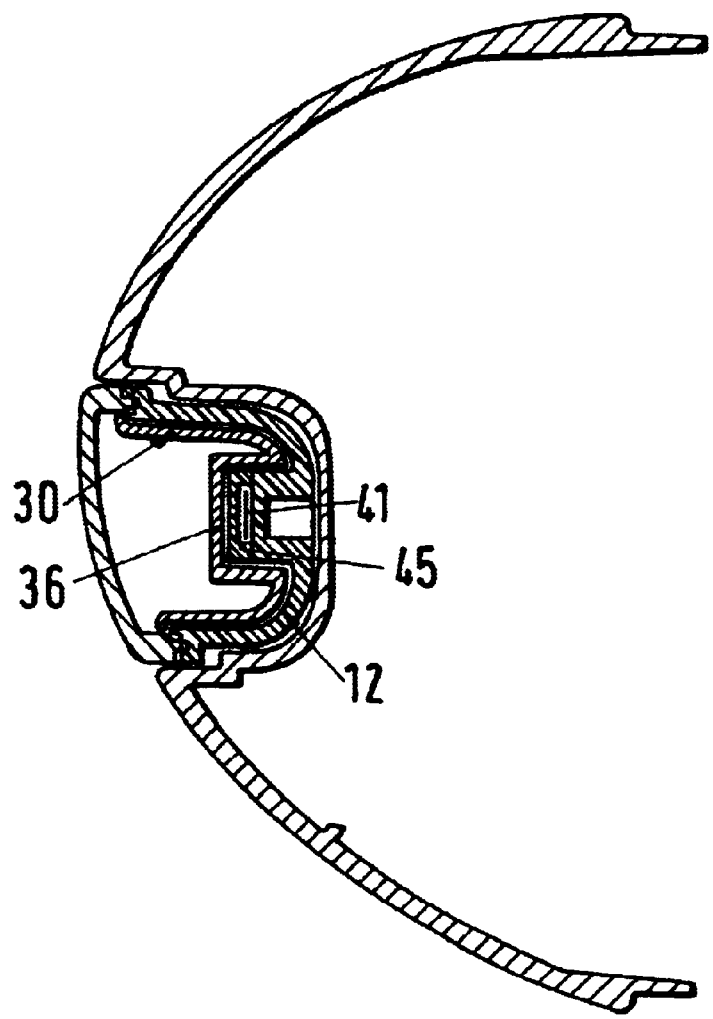
FIG. 6 shows a cross-section of the mirror head according to FIG. 5.

In the embodiment according to FIGS. 5 and 6 the conductive foil 41 is positioned underneath a cover 45 which is fastened to the lighting unit housing 12. By means of the cover 45 the conductive foil 41 is reliably protected against soiling, corrosion etc. The cover 45, as illustrated in FIGS. 5 and 6, has approximately the same cross-sectional contour as the lighting unit housing 12. In the area of the light sources 31 the cover 45 is provided with a bulge 46 which projects through the openings 39, 40 of the depressions 35 of the reflector 30. By this measure, the light sources 31 are protected by the cover 45. Accordingly, at least in the area of the bulges 46 the cover 45 is light-transmitting. Preferably, the entire cover 45 is made of a clear (transparent) plastic material. In other respects, the mirror head is of the same configuration as described in connection with the embodiments according to FIGS. 1 to 3.

In the embodiments according to FIG. 4, the cover 45 can also be provided in order to protect the conductive foil 41 and the light sources 31.

The cover 45 is preferably welded to the lighting unit housing 12 so that the conductive foil 41 with the light sources 31 is reliably sealed.

The lighting unit 7, 7a is a closed component which can be easily inserted into the receptacle 6 of the mirror head housing 2. As a result of the clip connection 22 the lighting unit 7, 7a can be easily exchanged, if needed. The number of light sources 31 can vary depending on the size of the lighting unit 7, 7a. The lighting unit itself can have very different shapes, depending on the type of application.

While specific embodiments of the invention have been shown and described in detail to illustrate the inventive principles, it will be understood that the invention may be embodied otherwise without departing from such principles.

What is claimed is:

1. An exterior rearview mirror for vehicles, said exterior rearview mirror comprising:
    a mirror head housing having a light-transmitting plate arranged therein;
    at least one lighting unit received in said mirror head housing and comprising at least one light source configured to emit light rays passing through said light-transmitting plate to the exterior of said mirror head housing (2);

at least one reflector positioned between said at least one light source and said light-transmitting plate;

said at least one reflector having at least one opening, wherein said at least one light source is positioned in said at least one opening; and wherein said at least one reflector has an end remote from the vehicle and wherein said end has a wall extending transverse to said light-transmitting plate, wherein said at least one opening is positioned in said wall and accommodates a first one of said at least one light sources.

2. The rearview mirror according to claim 1, wherein said at least one lighting unit has a lighting unit housing and wherein said at least one light source is arranged in said lighting unit housing.

3. The rearview mirror according to claim 2, wherein said lighting unit housing and said light-transmitting plate together form an enclosure of said lighting unit.

4. The rearview mirror according to claim 3, wherein said lighting unit housing has at least one projection pointing toward said light-transmitting plate.

5. The rearview mirror according to claim 4, wherein said at least one reflector has at least one depression and wherein said at least one projection projects into said at least one depression.

6. The rearview mirror according to claim 5, wherein said at least one opening is arranged in said at least one depression.

7. The rearview mirror according to claim 6, wherein said at least one depression has sidewalls and wherein said at least one opening is arranged in said sidewalls.

8. The rearview mirror according to claim 5, wherein said at least one projection is covered by said at least one depression in a direction toward said light-transmitting plate.

9. The rearview mirror according to claim 8, wherein said at least one depression has a bottom configured to cover said at least one projection.

10. The rearview mirror according to claim 4, wherein said at least one projection has two sidewalls angularly positioned relative to one another, wherein on each one of said sidewalls one of said light sources is positioned.

11. The rearview mirror according to claim 1, wherein said first light source is configured to emit light rays substantially transverse to a direction of travel of the vehicle.

12. An exterior rearview mirror for vehicles, said exterior rearview mirror comprising:

a mirror head housing having a light-transmitting plate arranged therein;

at least one lighting unit received in said mirror head housing and comprising at least one light source configured to emit light rays passing through said light-transmitting plate to the exterior of said mirror head housing;

at least one reflector positioned between said at least one light source and said light-transmitting plate;

said at least one reflector having at least one opening, wherein said at least one light source (31) is positioned in said at least one opening;

wherein said at least one lighting unit has a lighting unit housing and wherein said at least one light source is arranged in said lighting unit housing;

wherein said lighting unit housing and said light-transmitting plate together form an enclosure of said lighting unit;

wherein said lighting unit housing has at least one projection pointing toward said light-transmitting plate; and wherein said at least one projection has two sidewalls angularly positioned relative to one another, wherein on each one of said sidewalls one of said light sources is positioned.

13. The rearview mirror according to claim 1, wherein said at least one projection has a V-shaped cross-section.

14. The rearview mirror according to claim 1, wherein said lighting unit housing has a plug configured to supply electric current to said at least one light source.

15. The rearview mirror according to claim 14, comprising at least one conductive foil connected to said plug and said at least one light source for supplying electric current to said at least one light source.

16. The rearview mirror according to claim 15, wherein said at least one conductive foil is fastened to said lighting unit housing.

17. The rearview mirror according to claim 16, wherein said at least one conductive foil extends across said at least one projection.

18. The rearview mirror according to claim 15, further comprising at least one cover arranged in said lighting unit housing and configured to protect said at least one conductive foil.

19. The rearview mirror according to claim 18, wherein said at least one cover covers a longitudinal extension of said at least one conductive foil.

20. The rearview mirror according to claim 18, wherein said at least one cover covers said at least one light source.

21. The rearview mirror according to claim 20, wherein said at least one cover projects into said at least one opening of said at least one reflector.

22. The rearview mirror according to claim 21, wherein said at least one cover is comprised of a transparent material at least in the area of said at least one light source.

23. The rearview mirror according to claim 1, wherein said at least one lighting unit is detachably mounted in said mirror head housing.

24. The rearview mirror according to claim 1, wherein said mirror head housing has a receptacle configured to receive said at least one lighting unit.

25. The rearview mirror according to claim 24, wherein said receptacle is a recessed portion of said mirror head housing.

26. The rearview mirror according to claim 1, wherein said at least one light source is a light-emitting diode.

* * * * *